United States Patent
Huang

[19]

[11] Patent Number: 5,948,196
[45] Date of Patent: Sep. 7, 1999

[54] LAYERED CERAMIC REINFORCING FIBERS FOR USE IN COMPOSITES

[75] Inventor: Jianzhong Huang, Westerville, Ohio

[73] Assignee: Owens Corning Fiberglas Technology, Inc., Summit, Ill.

[21] Appl. No.: 08/571,012

[22] Filed: Dec. 12, 1995

Related U.S. Application Data

[63] Continuation-in-part of application No. 08/513,054, Aug. 9, 1995, abandoned.

[51] Int. Cl.⁶ .......................... B32B 18/00; B32B 31/08; D04H 3/16
[52] U.S. Cl. .......................... 156/167; 156/180; 428/374; 428/379
[58] Field of Search .................................. 428/374, 379; 156/167, 180

[56] References Cited

U.S. PATENT DOCUMENTS

| | | |
|---|---|---|
| 1,500,934 | 7/1924 | Hooper . |
| 2,313,296 | 3/1943 | Lamesch . |
| 2,334,961 | 11/1943 | Schoenlaub . |
| 2,882,173 | 4/1959 | Welsch . |
| 3,192,023 | 6/1965 | Stalego . |
| 3,209,641 | 10/1965 | Upton . |
| 3,274,324 | 9/1966 | Stalego . |
| 3,626,722 | 12/1971 | Corsentino . |
| 4,026,715 | 5/1977 | Erickson et al. . |
| 4,133,664 | 1/1979 | Aulich et al. . |
| 4,145,200 | 3/1979 | Yamazaki et al. . |
| 4,217,123 | 8/1980 | Titchmarsh . |
| 4,351,658 | 9/1982 | Olshansky . |
| 4,372,648 | 2/1983 | Black . |
| 4,453,962 | 6/1984 | Haranda et al. . |

(List continued on next page.)

FOREIGN PATENT DOCUMENTS

| | | |
|---|---|---|
| 0193846 | 9/1986 | European Pat. Off. . |
| 0367661 | 5/1990 | European Pat. Off. . |
| 0554119 | 8/1993 | European Pat. Off. . |
| WO 95/00453 | 1/1995 | WIPO . |

OTHER PUBLICATIONS

Chemical Engineers' Handbook, 5$^{th}$ ed., 1973.
Derwent Abstracts, AN 76–27579X, 1976.
Derwent Abstracts, AN 85–259702, 1985.

Primary Examiner—Johann Richter
Assistant Examiner—Tadfiq A. Solola
Attorney, Agent, or Firm—C. Michael Gegenheimer; Inger H. Eckert

[57] ABSTRACT

The present invention includes one or more fibers (12) made of a ceramic, such as glass, which are each suitable for being used as a reinforcing fiber (12) in a composite product or article. Each ceramic reinforcing fiber (12) has a ceramic core (24) and one or more ceramic layers (22) disposed around the core (24). The layered structure of the present ceramic reinforcing fiber (12) improves the overall strength and fracture toughness of the fiber (12). Before a crack propagating through the outermost layer (22) can propagate through the remainder of the fiber (12), a new crack must be initiated at the pristine surface (i.e., interface) of the underlying ceramic material. When there are multiple layers (22), a new crack must be initiated and propagate through each successive layer (22) of ceramic. A ceramic fiber composite article is made by disposing a plurality of the ceramic reinforcing fibers (12) into a suitable matrix. The ceramic reinforcing fibers (12) are each made by providing a source (14) of at least one molten ceramic material, suitable for making a reinforcing fiber (12) for a composite application, and drawing molten ceramic from the source (14) through at least two openings (20) to thereby form each ceramic reinforcing fiber (12). The source (14) can be one or more bushings (32), with each bushing (32) having a plurality of tips (16) and each tip (16) having at least two nozzle (18), one nozzle inside the other. These nozzle (18) form the at least two openings (20) through which molten ceramic is drawn.

29 Claims, 5 Drawing Sheets

U.S. PATENT DOCUMENTS

| | | |
|---|---|---|
| 4,466,818 | 8/1984 | Brongersma . |
| 4,624,692 | 11/1986 | Roba . |
| 4,873,303 | 10/1989 | Blackwood et al. . |
| 4,875,917 | 10/1989 | Lentz . |
| 4,897,100 | 1/1990 | Nice . |
| 4,956,199 | 9/1990 | Ruisi . |
| 4,973,503 | 11/1990 | Hotchkiss . |
| 4,974,933 | 12/1990 | Ainslie et al. . |
| 5,110,334 | 5/1992 | Ayers . |
| 5,122,226 | 6/1992 | Minford et al. . |
| 5,242,476 | 9/1993 | Bartel et al. . |
| 5,364,699 | 11/1994 | Hollenbaugh, Jr. et al. . |
| 5,468,546 | 11/1995 | Loftus et al. . |

LAYERED CERAMIC REINFORCING FIBERS FOR USE IN COMPOSITES

RELATED APPLICATION

This application is a continuation-in-part of applicant's earlier filed U.S. patent application Ser. No. 08/513,054 (OWE Docket No. 23666A), entitled GLASS FIBERS, filed Aug. 9, 1995, now abandoned.

TECHNICAL FIELD

The present invention is generally related to composites, more particularly, to ceramic reinforced composites and, even more particularly to a ceramic reinforcing fiber with one or more layers disposed around a core which is suitable for use in a composite.

BACKGROUND ART

Because of their relatively light weight and high strength, ceramic materials are widely used to make reinforcing fibers in a variety of composite applications. Such ceramic reinforcing fiber materials include various glasses and other inorganic materials exhibiting the properties desired for the resulting composite. Unfortunately, these ceramic materials are usually very crack sensitive. That is, the stress needed to cause a crack to propagate through a typical ceramic reinforcing fiber material, such as glass, is relatively low. Cracks can initiate from scratches or other imperfections formed on the surface of the ceramic reinforcing material. Glass reinforcing fibers are particularly susceptible to moisture induced cracking. Once a crack is formed, it usually propagates quickly through the ceramic material and can cause the reinforcing fiber to fail prematurely at relatively low applied stresses. This premature failure can significantly deteriorate the mechanical properties of the composite product or article made with such ceramic fibers.

In an effort to protect glass reinforcing fibers from moisture induced and other types of cracking, the surface of the each fiber is usually coated with a layer of some type of protective material, such as a conventional polymeric size, after the fibers are formed. However, the use of such a protective coating is not always as effective as desired. En addition, the step of coating the fibers with such a protective layer increases the costs associated with manufacturing the reinforcing fibers and ultimately the cost of the composite.

Therefore, there is a need for a more effective way to protect glass and other ceramic reinforcing fibers from premature failure due to crack formation and propagation. There is a further need for a less expensive way to protect the ceramic reinforcing fibers without having to coat the surface of each fiber with as thick a layer or with any Layer of some type of protective material, such as a conventional polymeric size or other chemical treatment.

DISCLOSURE OF INVENTION

This need is met by providing ceramic fibers, according to the present invention, which are suitable for being used as reinforcing fibers in a composite product or article. Each of the present reinforcing fibers has a ceramic core and at least one ceramic layer disposed around the core. When the present ceramic reinforcing fiber has a plurality of layers, the layers are disposed one inside the other and around the ceramic core. It is desirable for the multiple layers to be substantially concentric to one another and around the core. The ceramic material used for the reinforcing fibers can be any suitable glass or other inorganic material exhibiting the reinforcing properties desired for the resulting composite product. The layered structure of the present ceramic reinforcing fiber improves the overall strength and fracture toughness of the fiber. Before a crack propagating through the outermost layer can propagate through the remainder of the fiber, a new crack must be initiated at the pristine surface (i.e., interface) of the underlying ceramic material. When there are multiple layers in the fiber, a new crack must be initiated and propagate through each successive layer of ceramic material before the fiber will fail.

In one aspect of the present invention, a composite article is provided which comprises a matrix and a plurality of the present ceramic reinforcing fibers disposed in the matrix. Each of the at Least one layer and the core can be made from the same or a different ceramic material. Alternatively, one or more layers can be made from one ceramic material, and the core can be made from a different ceramic material. The matrix can be made from any material suitable for the resulting composite application. For example, matrix materials may include suitable polymeric materials (both thermoplastic and thermoset polymers), low melting metals and metal alloys (e.g., aluminum and aluminum alloys), and various ceramic materials which are sintered or otherwise low or high temperature fired (e.g., plasters and clays).

Each layer and the core can be made from a ceramic material that is suitable for making a reinforcing fiber for use in a composite article or product. However, it may also be desirable for each reinforcing fiber to include at least an outermost layer (i.e., the layer furthest from the core) or a core made from a ceramic material which would not, by itself, be a suitable material for making an entire reinforcing fiber (e.g., does not exhibit the properties desired, is cost prohibitive, etc.). For example, an expensive material with superior properties (e.g., fracture toughness, resistance to moisture induced cracking, alkaline resistance, etc.) can be used to form the outermost Layer, and possibly one or more other outer layers, in order to make a superior reinforcing fiber in a cost effective manner. An example of such an alkaline resistant glass material is generally referred to as Zirconia glass and typically contains at least about 20% zirconia ($ZrO_2$) by weight. Any increase in the cost of the fiber, due to the use of the material with superior properties, can be limited significantly by limiting the use of the more expensive material to forming only the outermost layer of the reinforcing fiber and by minimizing the thickness of the outermost layer. In another example, the core can be made from a ceramic material which exhibits properties normally not considered suitable for making a reinforcing fiber (e.g., an unacceptable sensitivity to moisture induced cracking). Such a fiber can be made acceptable by forming its outer layer from a ceramic material which exhibits properties typically considered suitable for making reinforcing fibers (e.g., an acceptable resistance to moisture induced cracking).

The mechanical properties, in particular the strength and toughness, of each reinforcing fiber as well as the resulting composite article can be improved by placing at least the outermost layer of each fiber in compression relative to its core. Such relative compression can be obtained by making the outermost layer from a material having a lower coefficient of thermal expansion than the material used for the core. For a fiber with multiple layers, each of the layers can be placed in compression relative to the core and any layers therebetween by using materials for the core and the layers which exhibit a decrease in coefficient of thermal expansion from the core to the outermost layer. Even if the reinforcing fiber is made from the same ceramic material, the outermost layer or layers of the fiber can still be put into compression relative to the core. Such a single material fiber can be placed in compression by maintaining the molten ceramic fiber material at a higher temperature when used to form the core and at a lower temperature when used to form the outermost layer or layers of the resulting fiber.

To even further improve the mechanical properties of a composite article, made according to the principles of the present invention, it may also be desirable to coat each of the present ceramic reinforcing fibers with a suitable chemical treatment. By so coating each reinforcing fiber, the chemical treatment can be disposed between each of the ceramic reinforcing fibers and the matrix material of the resulting composite article.

In another aspect of the present invention, a method is provided for making a ceramic fiber composite article. The method comprises the steps of forming a plurality of ceramic reinforcing fibers, where each fiber includes at least one ceramic layer disposed around a ceramic core. The method further comprises disposing a matrix material so as to surround the plurality of ceramic reinforcing fibers. This latter step can be performed, for example, by forcing the matrix material around the reinforcing fibers under pressure, by dipping the ceramic reinforcing fibers into a bath of the matrix material, and/or by using any other conventional technique or process. This method may also include gathering the reinforcing fibers into a bundle or strand before, during or after the matrix material is disposed to surround the reinforcing fibers. Depending on the the of composite being made, especially when an injection molding process is used, this method may also include the step of segmenting each ceramic reinforcing fiber into a plurality of relatively short discrete lengths.

It may be desirable to coat the plurality of ceramic reinforcing fibers with a suitable chemical treatment (e.g., a polymeric thermoset-based or thermoplastic-based treatment) before the fibers are surrounded by the matrix material. This chemical treatment can be the adapted to help the ceramic reinforcing fibers and the matrix material bond to one another. The chemical treatment may also be the type that is adapted to help prevent the formation and/or propagation of cracks in the outermost layer of the ceramic reinforcing fibers. By strengthening the bond between the ceramic reinforcing fibers and the matrix material and/or by helping to prevent crack formation or propagation, the mechanical properties (e.g., mechanical strength and toughness) of the resulting composite article, as well as each reinforcing fiber, can be improved.

It is desirable for ceramic reinforcing fibers incorporating the principles of the present invention to each have a diameter of up to about 50 microns. It may be more desirable for each ceramic reinforcing fiber to have a diameter in the range of from about 5 microns to about 30 microns. And, it may even be more desirable for each ceramic reinforcing fiber to have a diameter in the range of from about 9 microns to about 26 microns. For example, the diameter of carbon reinforcing fibers can range from about 5 microns to about 15 microns and the diameter of alumina ($Al_2O_3$) or silicon carbide (SiC) can range from about 15 to about 25 microns. The outermost ceramic layer of each reinforcing fiber should have a depth which is thick enough to protect the underlying pristine ceramic surface yet thin enough that the overall strength of the reinforcing fiber would not be significantly affected if the outermost layer were effectively removed. One way that the outermost layer may be effectively removed as a factor in affecting the overall strength of the reinforcing fiber is when at least one continuous crack is formed circumferentially around the fiber and completely through the outermost layer so as to physically severe the outermost layer in two.

The one or more layers and the core of each reinforcing fiber can be made from the same ceramic material or different ceramic materials. For example, the outermost layer can be made from a ceramic material having one composition and the core can be made from a ceramic material having another composition. When the ceramic material used is a glass material, it is desirable for the glass material to comprise no more than about 95% by weight of silica. It is more desirable for the glass material to comprise no more than about 85% by weight of silica. And, it is even more desirable for the glass material to comprise in the range of about 55% to about 85% by weight of silica.

In an additional aspect of the present invention, an apparatus is provided for making a plurality of ceramic reinforcing fibers, each fiber having a ceramic core and at least one ceramic layer disposed around the core. The resulting fiber is suitable for use in a composite article. The apparatus comprises a source of at least one molten ceramic material suitable for making a ceramic reinforcing fiber for a composite application. The source can be one or more bushings or crucibles suitable for containing one or more ceramic materials in a molten state. Each bushing or crucible has a plurality of tips. Each tip includes at least two nozzles, disposed one inside the other. These nozzles form at least two openings through which molten ceramic material is drawn to form a reinforcing fiber having at least one layer disposed around a core. Each layer and the core are made using any suitable ceramic material.

When the apparatus for making a plurality of the present reinforcing fibers uses a single bushing containing one molten ceramic material, the resulting ceramic reinforcing fibers are each formed by drawing the same molten ceramic material through the openings formed by the nozzles of each tip. Alternatively, when the apparatus for making a plurality of the present reinforcing fibers includes a plurality of bushings, with each bushing containing a different molten ceramic material, a different molten ceramic material is drawn through at least two of the nozzle openings used to form each reinforcing fiber. In either case, it may be desirable for two or more of the nozzles used to form each tip to be joined together by one or more ribs.

In a further aspect of the present invention, a method is provided for making a reinforcing fiber having a ceramic core and at least one ceramic layer disposed around the core, where the resulting fiber is suitable for use in a composite article. The method comprises the steps of providing a source of at least one suitable ceramic material in a molten state. The source comprises one or more bushings, and each molten ceramic material is contained in at least one bushing. The method further comprises the step of drawing molten ceramic material from the source through at least two openings to thereby form the ceramic reinforcing fiber.

When only one molten ceramic material is being provided by the source, the step of drawing molten ceramic includes drawing the one molten ceramic material through each of the openings. When a plurality of molten ceramic materials are being provided by the source, each of the molten ceramic materials is drawn through one or more of the openings.

The objectives, features, and advantages of the present invention will become apparent upon consideration of the specification and the appended drawings.

MODES FOR CARRYING OUT THE INVENTION

Figure 1:
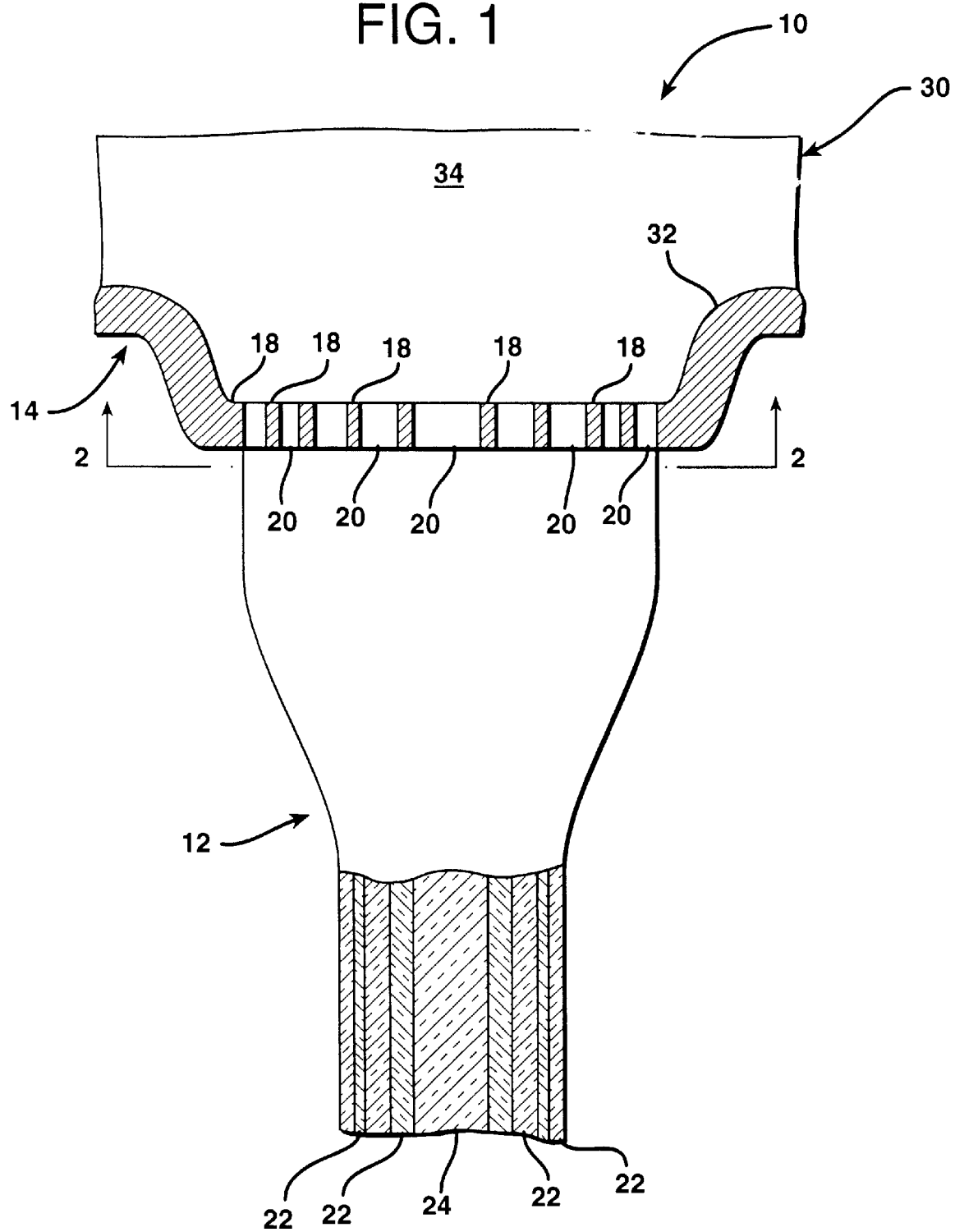
FIG. 1 is a sectional view of one embodiment of a tip on a bushing of an apparatus for making a plurality of ceramic reinforcing fibers, according to the present invention, with a broken away section of a resulting single ceramic reinforcing fiber being shown in cross section.

Although the present invention is herein described in terms of specific embodiments, it will be readily apparent to those skilled in this art that various modifications, re-arrangements, and substitutions can be made without departing from the spirit of the invention. The scope of the present invention is thus only limited by the claims appended hereto.

In general, an apparatus 10 for making a plurality of ceramic reinforcing fibers 12, according to the present invention, comprises a source 14 of at least one molten ceramic material suitable for making a reinforcing fiber for a composite application. The source 14 can be one or more bushings or crucibles suitable for containing one or more ceramic materials in a molten state. The source 14 of molten ceramic material includes a plurality of tips 16. Each tip 16 includes at least two nozzles 18, disposed one inside the other. The nozzles 18 of each tip 16 form at least two openings 20 through which molten ceramic material is drawn to form a reinforcing fiber 12 having at least one layer 22 disposed around a core 24. It is desirable for the nozzles IS to be concentric to one another to help ensure that each layer 22 has a uniform thickness around the core 24. If each layer has a uniform thickness, any protection afforded by each layer will more likely by uniform.

Each layer 22 and the core 24 are made using any suitable ceramic material. The one or more layers 22 and the core 24 of each reinforcing fiber 12 can be made from the same ceramic material or different ceramic materials. For example, the outermost layer 22 can be made from a ceramic material having one composition and the core can be made from a ceramic material another composition.

The following is a detailed description of the present invention in terms of using glass for the reinforcing fiber material. However, the present invention is not intended to be limited to the use of glass or any other ceramic material, for making reinforcing fibers suitable for use in a composite product. In addition, the structures of the following apparatus and methods, for making glass reinforcing fibers and composite products therefrom, are not intended to be limited to being used only with glass materials. The scope of the present invention is thus only limited by the claims appended hereto.

Figure 2:
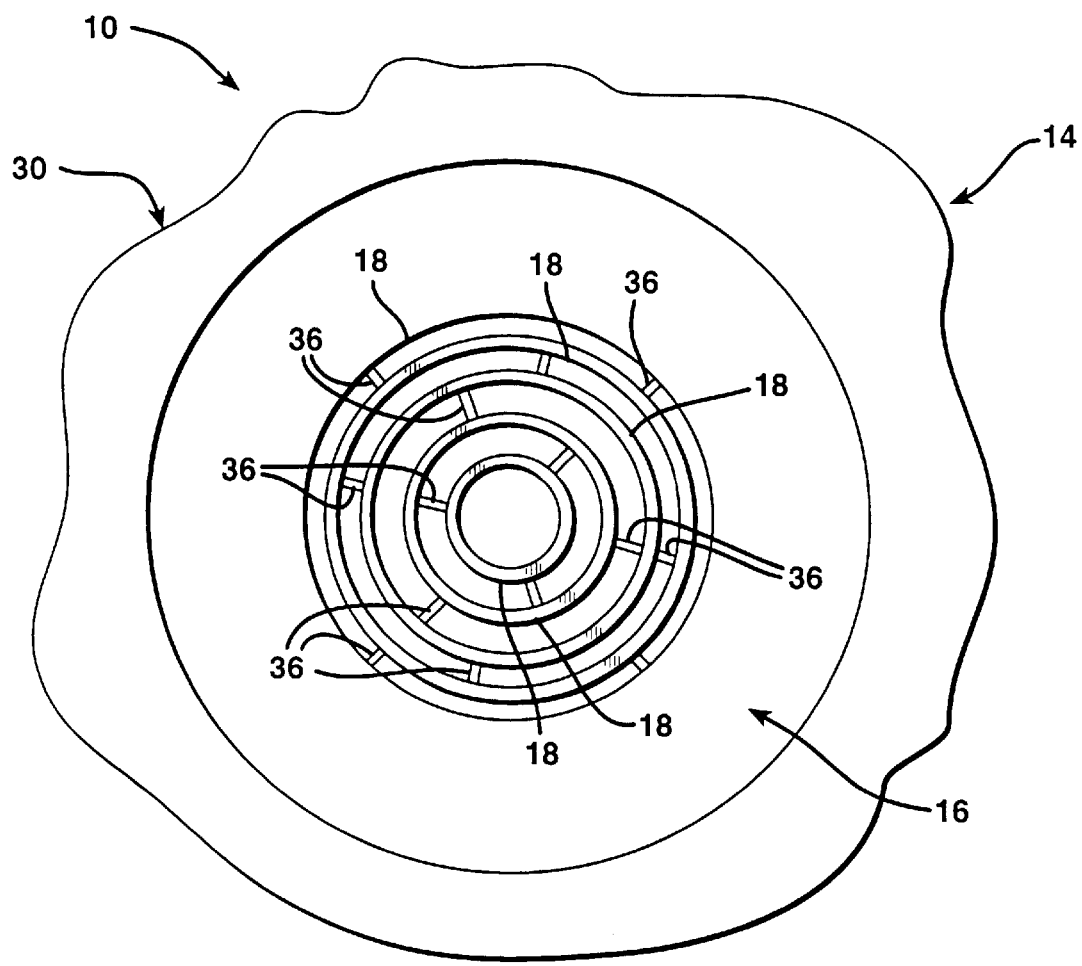
FIG. 2 is a bottom view of the whole bushing tip of FIG. 1 taken along lines 2—2.

Referring to FIGS. 1 and 2, one embodiment of the apparatus 10, designated herein by the reference numeral 30, uses a single bushing 32 containing one type of glass material 34 in a molten state. Other than its tips 16, bushing 32 is of conventional construction. The bushing 32 has a plurality of tips 16, with each tip 16 having four nozzles 18 forming four circular nozzle openings 20. The nozzles 18 are joined together by a plurality of ribs 36. The number and size of the ribs 36 used with each tip 16 should be sufficient to keep the nozzles 18 in position without significantly disrupting the flow of the glass material 34 through the nozzle openings 20. The multilayered reinforcing fibers 12 made using the apparatus 30 are each formed with an inner core 24 and four concentric outer layers 22 by drawing the same molten glass material through the five openings 20 formed by the five nozzles 18 of each tip 16.

Figure 3:
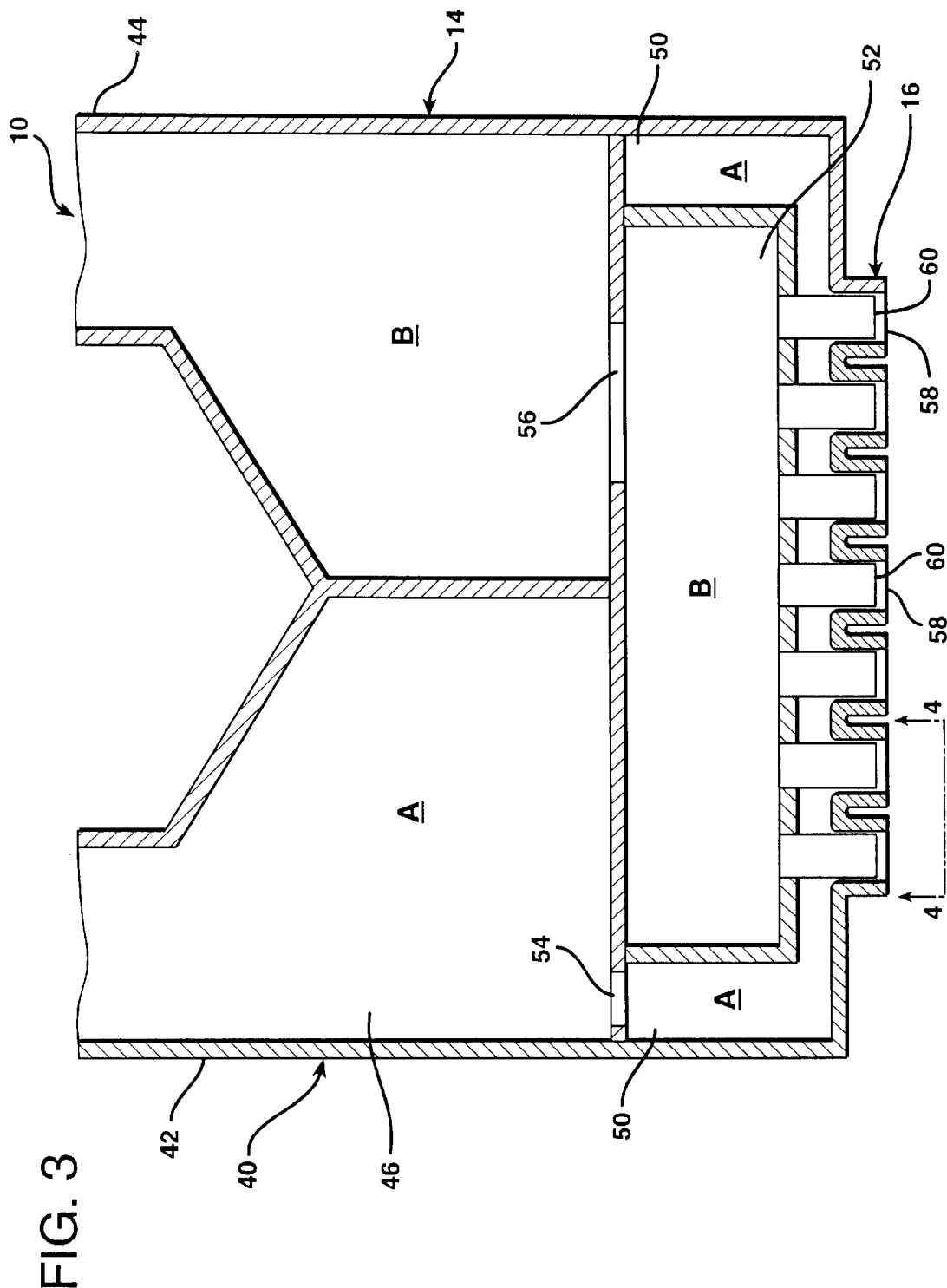
FIG. 3 is a sectional view of one embodiment of an apparatus for making a plurality of ceramic reinforcing fibers using two ceramic materials.
Figure 4A:
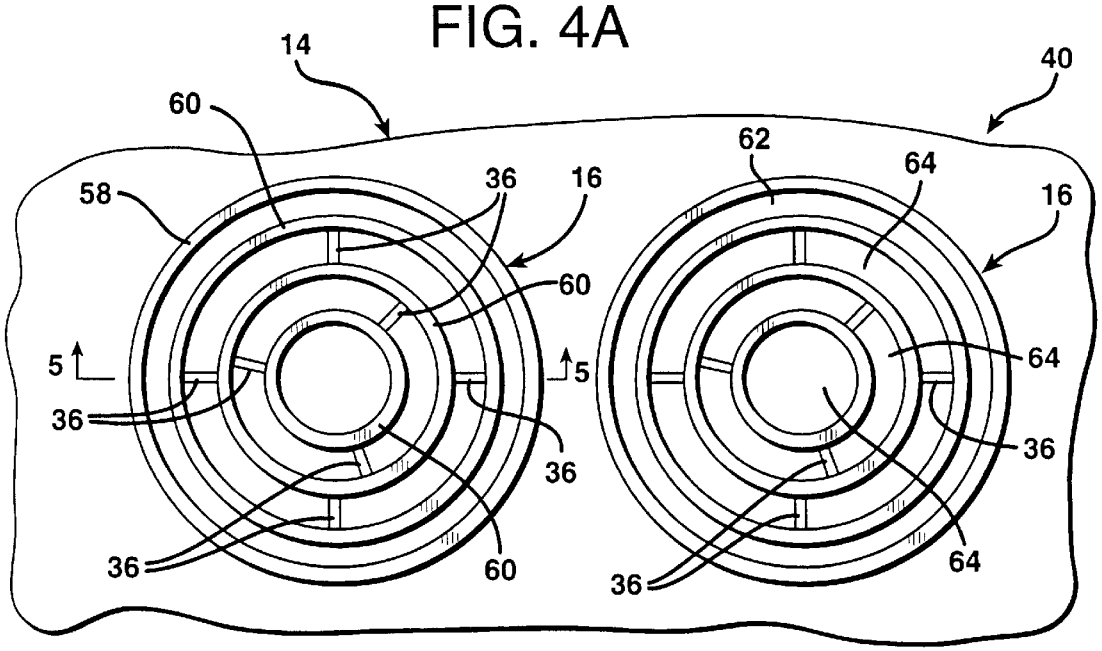
FIG. 4A is a bottom view taken along the lines 4—4 showing one type of tip used in the apparatus of FIG. 3.
Figure 4B:
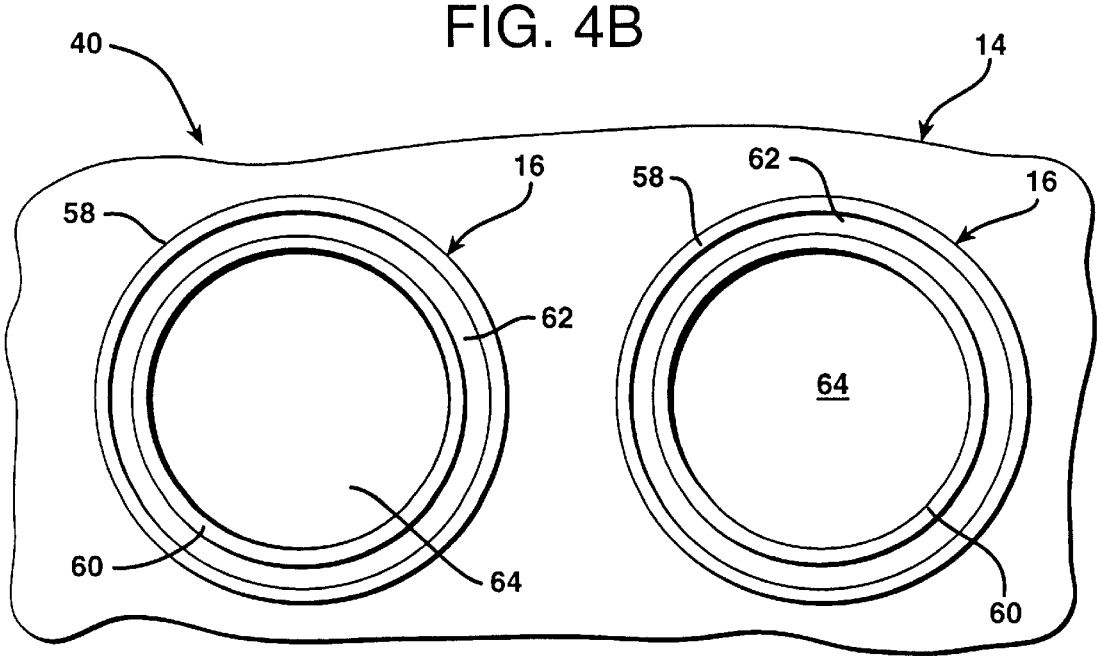
FIG. 4B is a bottom view taken along lines 4—4 showing an alternative type of tip used in the apparatus of FIG. 3.
Figure 5:
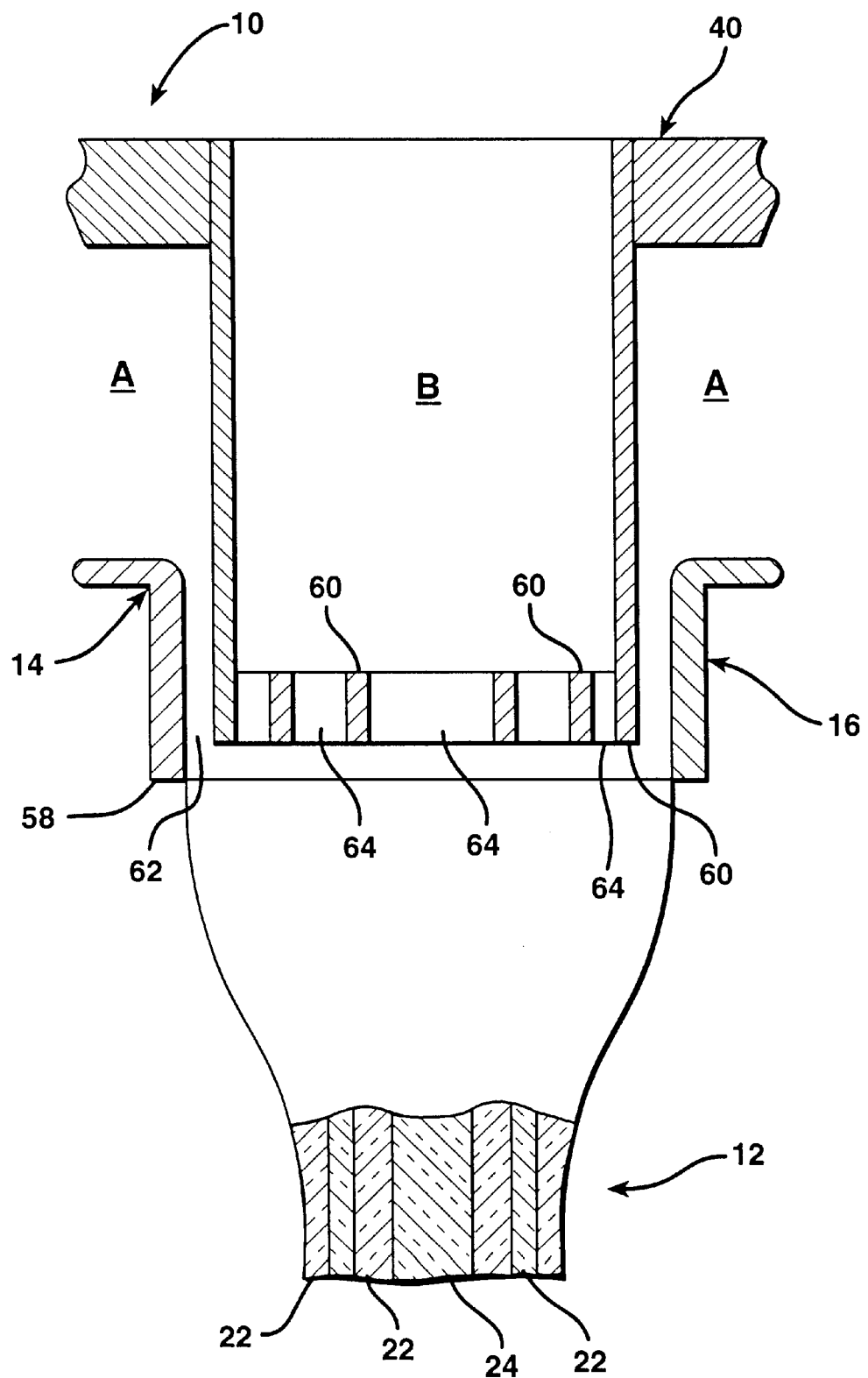
FIG. 5 is a sectional view taken along lines 5—5 of the tip of FIG. 4B, with a broken away section of a resulting dual ceramic reinforcing fiber being shown in cross section.

Referring to FIGS. 3–5, various fiber materials can be used to make a single reinforcing fiber 12. Another embodiment of the apparatus 10, designated herein by the reference numeral 40, includes a source 14 of two different glass fiber materials. The source 14 includes two crucibles or bushings 42 and 44 which are each operatively adapted, using conventional techniques, to contain one of two molten glass fiber materials A and B, respectively. Each of the crucibles 42 and 44 includes a storage chamber 46 and 48 and a distribution chamber 50 and 52, respectively. Each of the storage chambers 46 and 48 is in fluid communication with its corresponding distribution chamber 50 and 52 through one or more openings 54 and 56, respectively. The apparatus 40 also includes a plurality of tips 16 which are each operatively adapted so as to be in fluid communication with both of the distribution chambers 50 and 52.

The nozzles 18 forming each of the tips 16 of the apparatus 40 include an outer nozzle 58 along with one inner nozzle 60 (see FIG. 4A) or a plurality of inner nozzles 60 (see FIG. 4B). The openings 20 in each of the tips 16 of the apparatus 40 include an outer annular opening 62 formed by the outer nozzle 58 and the outermost inner nozzle 60. The openings 20 of apparatus 40 also include one or moire inner openings 64 formed by one or more inner nozzles 60, respectively. The outer opening 62 of each tip 16 is in fluid communication with the distribution chamber 50, containing the molten glass material A. The one or more inner openings 64 of the tips 16 are in fluid communication with the distribution chamber 52, containing the molten glass material B.

The glass fiber materials A and B are either melted inside of the storage chambers 46 and 48, respectively, or supplied to their respective chamber 46 and 48 in a molten state. The one or more openings 54 and 56 are dimensioned so that the corresponding molten glass material A and B back up and accumulate in chambers 46 and 48, respectively. The size and number of the openings 54 and 56 can be adapted to produce the desired flow rate of each molten glass material A and B into its corresponding distribution chamber 50 and 52. Other factors which can affect the flow rate of the molten glass materials A and B include the viscosity of the materials used, the dimensions of the nozzle openings 20, the rate at which the fibers 12 are pulled from the source 14 of molten material and the amount of pressure exerted by the molten material, either directly by its mass and/or indirectly by transmitted pressure from an independant source (e.g., an external pressure applying mechanism). In one or more of these ways, the flow rate of each molten glass material A and B, through its corresponding nozzle openings 62 and 64, can be controlled. The core 24 and all but the outer most layer 22 of each reinforcing fiber 12, formed using the apparatus 40, is made of the fiber material B. The outermost layer 22 of this reinforcing fiber 12 is made of the fiber material A. Depending upon which embodiment of tip 16 is used, that of FIG. 4A or that of FIG. 4B, the fibers 12 formed by apparatus 40 will have a core 24 and only one outer layer 22 or a core 24 and three concentric layers 22, respectively.

In a modification of apparatus 40 (not shown), each tip 16 can include two or more outer nozzles 58 to form two or more outer openings 62, along with the one or more inner openings 64 formed by the one or more inner nozzles 60. The outer nozzles 58 can be connected with ribs 36, in the manner previously described for apparatus 30. With this modified version of apparatus 40, all of the outer openings 62 are in fluid communication with the distribution chamber 52, containing the glass material A. Thus, all of the outer layers 22 formed by the outer nozzles 58 of this modified apparatus 40 will be made of the fiber material A.

While the exemplary apparatus 30 and 40 described above produce fibers 12 with a circular core 24 and one or more concentric annular layers 22, the present invention is not intended to be so limited. The thickness, shape and number of each layer 22 as well as of the core 24 can be varied as desired. The thickness of the core 24 and each layer 22 can be varied by using nozzles IS of different sizes (i.e., by varying the size of each opening 20). The cross sectional shape of the core 24 and each layer 22 can be varied by using nozzles 18 of different shapes (i.e., by varying the shape of each opening 20). The number of layers 22, and thereby the diameter of the core 24, can be varied by reducing the number of nozzles 18 used.

Its layered structure improves the overall strength and fracture toughness of the reinforcing fiber 12. Before a crack formed in a layer 22 of the fiber 12 can propagate through the remainder of the fiber 12, a new crack must be initiated at the pristine surface (i.e., interface) of the next underlying element of the fiber 112 (i.e., either a layer 22 or the core 24). When there are multiple layers 22, such as with the fibers 12 of FIGS. 2 and 5, a new crack must be initiated and propagate through each successive layer 22 before the fiber 12 will fail.

In general, it is desirable for a glass reinforcing fiber to have a diameter of up to about 50 microns. It is more desirable for glass reinforcing fibers to have a diameter in the range of from about 5 microns to about 30 microns. And, it is even more desirable for glass reinforcing fibers to have a diameter in the range of from about 9 microns to about 26 microns. The outermost layer 22 of the reinforcing fiber 12 should have a depth which is thick enough to protect the underlying pristine surface yet thin enough that the overall strength of the reinforcing fiber 12 would not be significantly affected if the outermost layer where effectively removed. One way that the outermost layer 22 may be effectively removed as a factor in affecting the overall strength of the reinforcing fiber 12 is when at least one continuous crack is formed circumferentially around the fiber 12 and completely through the outermost layer 22 so as to physically severe the outermost layer 22 into two separate sections.

While the present fibers 12 can be made with any ceramic material suitable for making reinforcing fibers used in a composite article or product (not shown), it may be desirable for each reinforcing fiber 12 to include at least an outermost layer 22 (i.e., the layer 22 furthest out from the core 24) or a core 24 made from a ceramic material which would not, by itself, be suitable (e.g., does not exhibit the properties desired, is cost prohibitive, etc.) for making the entire reinforcing fiber. For instance, a ceramic fiber material which exhibits one or more superior properties (e.g., fracture toughness, resistance to moisture induced cracking, alkaline resistance, etc.) but is relatively expensive can be used to make superior reinforcing fibers 12 in a cost effective manner by using the more costly ceramic material to make only the outermost layer 22, and possibly one or more other adjacent layers 22. The thickness of the layers 22 made with the more expensive material can also be minimized to reduce costs.

It may also be desirable to make a relatively inexpensive reinforcing fiber by forming at least the outermost layer 22 from a ceramic material which exhibits properties typically considered suitable for making reinforcing fibers (e.g., an acceptable resistance to moisture induced cracking), while the remaining bulk of the fiber (i.e., at least the core 24, and possibly one or more inner layers 22) is made from a ceramic material which exhibits properties normally considered unsuitable for making a reinforcing fiber (e.g., an unacceptable sensitivity to moisture induced cracking). Specific examples of this later reinforcing fiber can be found in applicant's earlier filed U.S. patent application Ser. No. 08/513,054, entitled GLASS FIBERS, filed Aug. 9, 1995, which is incorporated by reference herein in its entirety.

The mechanical properties, in particular the strength and toughness, of each reinforcing fiber 12 as well as the resulting composite article can be improved by placing at least the outermost layer 22 of each fiber 12 in compression relative to its core 24. Such relative compression can be obtained by making the outermost layer 22 from a material having a lower coefficient of thermal expansion than the material used for the core 24. For a fiber 12 with multiple layers 22, each of the layers 22 can be placed in compression relative to the core 24 and any layers 22 therebetween by using materials for the core 24 and the layers 22 which exhibit a decrease in coefficient of thermal expansion from the core 24 to the outermost layer 22. Even if the reinforcing fiber 12 is made from the same material, the outermost layer 22 or layers 22 of the fiber 12 can still be put into compression relative to the core 24. Such a single material fiber 12 can be placed in compression by maintaining the molten fiber material at a higher temperature when used to form the core 24 and at a lower temperature when used to form the outermost layer 22 or layers 22 of the resulting fiber 12.

Examples of glass ceramic materials which can be used to form part or all of a reinforcing fiber 12, according to the present invention, is disclosed in the Table below. When the ceramic material used is a glass material, it is desirable for the glass material to comprise no more than about 95% by weight of silica ($SiO_2$). It is more desirable for the glass material to comprise no more than about 85% by weight of silica. And, it is even more desirable for the glass material to comprise in the range of about 55% to about 85% by weight of silica.

TABLE

Composition ranges of exemplary fiber glasses (weight %)

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| $SiO_2$ | 72–72.5 | 60–65 | 74.5 | 52–56 | 53.7 | 64.3–65 | 58 | 71 | 60.7 |
| $Al_2O_3$ | 0.6–1.5 | 2–6 | 0.3 | 12–16 | — | 24.8–25 | 11 | 1 | — |

TABLE-continued

Composition ranges of exemplary fiber glasses (weight %)

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| $B_2O_3$ | — | 2–7 | 22 | 8–13 | — | — | — | — | — |
| CaO | 9–10.0 | 13–16 | 0.5 | 16–25 | 12.9 | 0.01 | 22 | — | — |
| MgO | 2.5–3.5 | 3–4 | — | 0–6 | 9 | 10–10.3 | 2.6 | — | — |
| CaO + MgO | 11.5–13.5 | 15–20 | — | 0–25 | — | — | — | — | — |
| $Li_2O$ | — | — | — | — | 3 | — | — | 1 | 1.3 |
| $K_2O$ | — | 0–2 | 0–1.3 | 0–1 | — | — | — | — | 2 |
| $Na_2O$ | 13–14.2 | 7.5–12 | 1 | — | — | 0–0.27 | 1 | 11 | 14.5 |
| $K_2O + Na_2O$ | — | 8–12 | — | 0–3 | — | — | — | — | — |
| $TiO_2$ | — | — | — | 0–0.4 | — | 7.9–8.0 | — | 2.2 | — |
| $CeO_2$ | — | — | — | — | 3 | — | — | — | — |
| $ZrO_3$ | — | — | — | — | 2 | — | — | 16 | 21.5 |
| BeO | — | — | — | — | 8 | — | — | — | — |
| ZnO | — | — | — | — | 0 | — | 2.8 | — | — |
| $Fe_2O_3$ | — | — | — | .05–.4 | 0.5 | 0–0.2 | — | — | — |
| $F_2$ | — | — | — | 0–0.5 | — | — | — | — | — |

The Example 1 composition is a soda lime glass. The Example 2 composition is a glass with high chemical durability. The Example 3 composition is a glass with a low dielectric constant. The Example 4 composition is a glass with low electrical conductivity. The Example 5 composition is a high modulus glass. The Example 6 composition is a high strength glass. The Example 7 composition is a glass with good electrical properties and good chemical resistance. The Example 8 and 9 compositions are alkali resistant zirconia glasses.

A ceramic fiber composite article (not shown) can be made with the present reinforcing fibers 12 according to conventional composite manufacturing techniques and in accordance with the principles of the present invention. The matrix used for the composite article can be made from any material suitable for the resulting composite application. For example, matrix materials may include suitable polymeric materials (both thermoplastic-type and thermoset-type polymers), low melting metals and metal alloys (e.g., aluminum and aluminum alloys), and various ceramic materials which are sintered or otherwise low or high temperature fired (e.g., plasters and clays). The desired matrix material is disposed so as to surround a plurality of the present reinforcing fibers 12. This step can be performed, for example, by forcing the matrix material around the reinforcing fibers 12 under pressure, by dipping the reinforcing fibers 12 into a bath of the matrix material, and/or by using any other conventional technique or process.

Typically, the reinforcing fibers 112 are gathered into a bundle or strand before, during or alter the matrix material is disposed to surround the reinforcing fibers 12. Depending on the type of composite being made, each reinforcing fiber 12 can be used in long lengths or segmented into a plurality of relatively short discrete lengths. For example, short discrete lengths of reinforcing fibers 12 are especially suitable when an injection molding process is used to make the composite article.

To further improve the mechanical properties of a composite article, made according to the principles of the present invention, it may also be desirable to coat each of the present reinforcing fibers 12 with a suitable chemical treatment (e.g., a polymeric thermoset-based or thermoplastic-based treatment) before the fibers 12 are surrounded by the matrix material. The chemical treatment can be the type that is adapted to help prevent the formation and/or propagation of cracks in the outermost layer of the reinforcing fibers 12. The chemical treatment can also be the type that remains, at least in part, disposed between each of the reinforcing fibers 12 and the matrix material of the resulting composite article so that the reinforcing fibers 12 and the matrix material can bond to one another. By strengthening the bond between the reinforcing fibers 12 and the matrix material and/or by helping to prevent crack formation or propagation, the mechanical properties (e.g., mechanical strength and toughness) of the resulting composite article, as well as each reinforcing fiber 12, can be improved.

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. A ceramic fiber composite article comprising:
    a matrix; and
    a plurality of ceramic reinforcing fibers disposed in said matrix, each of said ceramic reinforcing fibers comprising at least one layer disposed around a core, each of said at least one layer and said core being made from a ceramic material.

2. A ceramic fiber composite article as set for in claim 1, wherein each of said at least one layer and said core is made from the same ceramic material.

3. A ceramic fiber composite article as set forth in claim 1, wherein said at least one layer includes an outermost layer made from one ceramic material and said core is made from another ceramic material.

4. A ceramic fiber composite article as set forth in claim 3, wherein the ceramic material forming said outermost layer has a lower coefficient of thermal expansion than the ceramic material forming said core.

5. A ceramic fiber composite article as set forth in claim 1, wherein said at least one layer includes an outermost layer which is in compression relative to said core.

6. A ceramic fiber composite article as set forth in claim 1 wherein said at least one layer is a plurality of layers.

7. A ceramic fiber composite article as set forth in claim 6, wherein said plurality of layers are substantially concentric.

8. A ceramic fiber composite article as set forth in claim 6, wherein said plurality of layers includes an outermost layer and the coefficient of thermal expansion of the ceramic material forming each of said plurality of layers and said core decreases from said core to said outermost layer.

9. A ceramic fiber composite article as set forth in claim 1, wherein the ceramic material used to make said reinforcing fibers is a glass material.

10. A ceramic fiber composite article as set forth in claim 1, wherein a chemical treatment is disposed between each of said plurality of ceramic reinforcing fibers and said matrix.

11. A ceramic reinforcing fiber for use in a composite article, said ceramic reinforcing fiber comprising at least one layer disposed around a core, each of said at least one layer and said core being made from a ceramic material.

12. A ceramic reinforcing fiber as set forth in claim 11, wherein said at least one layer is a plurality of layers.

13. A ceramic reinforcing fiber as set forth in claim 11, wherein said ceramic reinforcing fiber has a diameter of up to about 50 microns.

14. A ceramic reinforcing fiber as set forth in claim 11, wherein said ceramic reinforcing fiber has a diameter in the range of from about 5 microns to about 30 microns.

15. A ceramic reinforcing fiber as set forth in claim 11, wherein said ceramic reinforcing fiber has a diameter in the range of from about 9 microns to about 26 microns.

16. A ceramic reinforcing fiber as set forth in claim 11, wherein said at least one layer includes an outermost layer having a thickness which is thin enough that the overall strength of said ceramic reinforcing fiber would not be significantly affected if said outermost layer where effectively removed.

17. A ceramic reinforcing fiber as set forth in claim 11, wherein said at least one layer and said core are made from the same ceramic material.

18. A ceramic reinforcing fiber as set forth in claim 11, wherein said at least one layer includes an outermost layer made from a ceramic material having one composition and said core is made from a ceramic material having another composition.

19. A ceramic reinforcing fiber as set forth in claim 11, wherein said ceramic material is a glass material comprising up to about 95% by weight of silica.

20. A ceramic reinforcing fiber as set forth in claim 11, wherein said ceramic material is a glass material comprising up to about 85% by weight of silica.

21. A ceramic reinforcing fiber as set forth in claim 11, wherein said ceramic material is a glass material comprising in the range of about 55% to about 85% by weight of silica.

22. A method of making a ceramic fiber composite article comprising the steps of:

forming a plurality of ceramic reinforcing fibers, each of the reinforcing fibers comprising at least one layer of ceramic material disposed around a core of the same or a different ceramic material; and disposing a matrix material so as to surround the plurality of ceramic reinforcing fibers.

23. A method as set forth in claim 22, further comprising the step of gathering the reinforcing fibers into a strand.

24. A method as set forth in claim 22, further comprising the step of segmenting each of the plurality of ceramic reinforcing fibers into a plurality of short discrete lengths.

25. A method as set forth in claim 22, further comprising the step of coating each of the plurality of ceramic reinforcing fibers with a chemical treatment before said step of disposing the matrix material so as to surround the ceramic reinforcing fibers.

26. A method as set forth in claim 22, wherein said fiber forming step includes forming a plurality of glass reinforcing fibers with each of the fibers having at least a core made of glass material.

27. A method for making a ceramic reinforcing fiber comprising the steps of:

providing a source of at least one molten ceramic material suitable for making a ceramic reinforcing fiber for a composite; and drawing molten ceramic from the source through at least two openings to thereby form a ceramic reinforcing fiber comprising at least one ceramic layer disposed around a ceramic core.

28. A method as set forth in claim 27, wherein said step of providing a source includes providing a source of one molten ceramic material and said step of drawing molten ceramic includes drawing the molten ceramic material through each of the openings.

29. A method as set forth in claim 27, wherein said step of providing a source includes providing a source of a plurality of molten ceramic materials and said step of drawing molten ceramic includes drawing each of the molten ceramic materials through at least one of the openings.

* * * * *